April 4, 1939. H. W. HOFFMAN 2,153,419
COMBINED BLOWER AND POWDER SPRAYING DEVICE
Filed Oct. 29, 1937
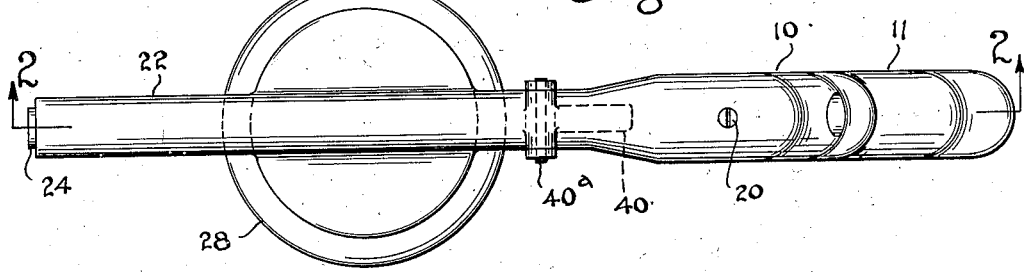
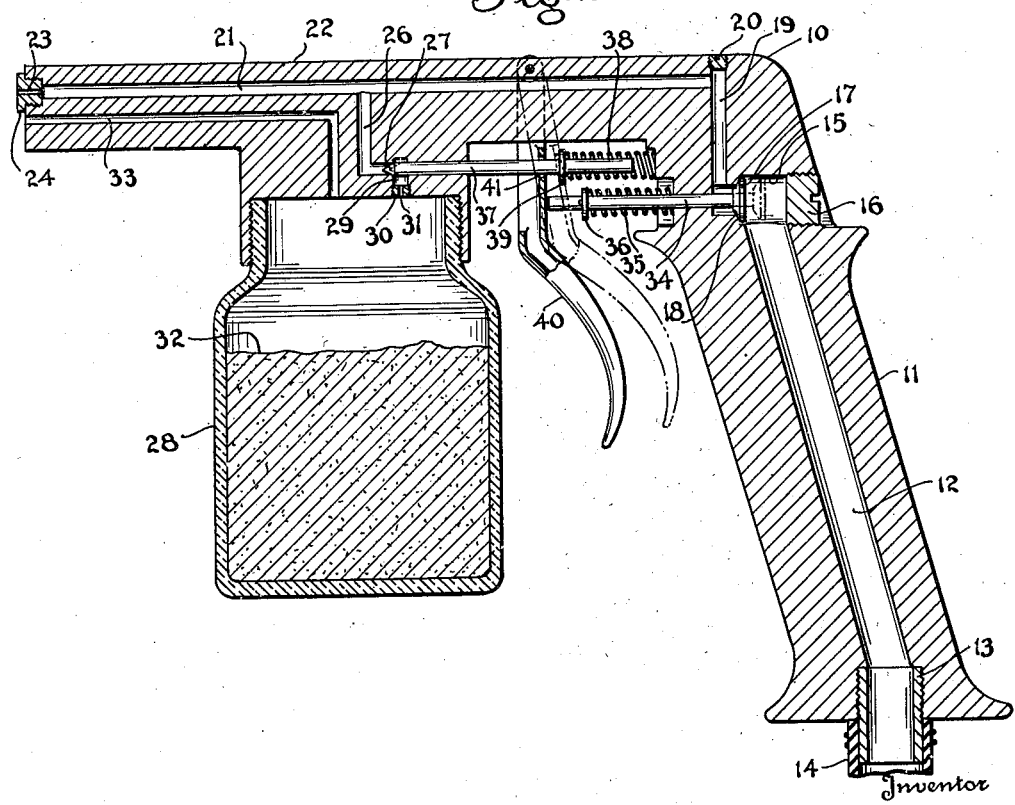
Inventor
Harley W. Hoffman
By
Attorney Patented Apr. 4, 1939

2,153,419

UNITED STATES PATENT OFFICE 2,153,419

COMBINED BLOWER AND POWDER SPRAYING DEVICE

Harley W. Hoffman, Akron, Ohio

Application October 29, 1937, Serial No. 171,739

6 Claims. (Cl. 221—61)

This invention relates to a combined blower and powder spraying device.

The general purpose of the invention is to provide, for use in barber shops and beauty parlors, a combined blower and powder spraying device, for blowing hair-cuttings off the skin of a patron after his hair has been cut, for drying the skin, and for applying powder, such as talcum powder, to the skin after hair-cuts and shaves, such device to replace the unsanitary brush or towel heretofore used for brushing off the hair or drying the skin or for applying powder.

The foregoing and other purposes of the invention are attained in the combined blower and powder spraying device illustrated in the accompanying drawing and described below. It is to be understood that the invention is not limited to the specific form thereof shown and described.

Of the accompanying drawing:

Figure 1 is a top plan view of a blower embodying the invention, and

Figure 2 is a section on line 2—2 of Figure 1.

Referring to the drawing, the numeral 10 designates a gun having a handle 11 through which may be formed a bore or duct 12, which may be connected by a nipple 13 with a flexible air-supply line 14, which is connected to a suitable source of air under pressure.

Duct 12 extends to a valve bore 15 in the gun, the outer end of which may be closed by a removable plug 16, and in which is arranged a valve 17 seating at 18 and controlling admission of air under pressure to a duct 19 which extends upwardly and the top end of which may be closed by a removable plug 20. Duct 19 communicates with a duct 21 extending along the barrel 22 of gun 10 to the end thereof. In the end of the barrel, a restriction may be provided in duct 21 by removably securing therein a plug 24 with a small outlet orifice 23 for directing a fine stream of air under substantial force against the surface of the skin of a patron.

Branching from duct 21 is a duct 26 leading to a valve 27 controlling admission of air under pressure to a receptacle 28, removably secured on the bottom of the gun barrel 22 as shown in Figure 2. Communication from valve 27 to receptacle 28 is established by duct 29 in which may be a restriction provided by a plug 30 having a small air-outlet orifice 31 whereby when valve 27 is open a thin stream of air will be directed under substantial pressure down into receptacle 28 and into a supply of powder 32 contained therein.

A duct 33 extends from receptacle 28 and along the barrel 22 to the end thereof, such duct being preferably unrestricted for free passage of air and entrained powder through the duct and out of the end of the barrel, and onto the surface of a patron's skin.

It is desirable that the combined blower and powder spray device be adapted to be used at will to apply a stream of air, without powder, for blowing off hair-cuttings, drying the skin, etc., and for supplying when desired a spray of powder to be applied over the surface of the skin after hair-cuts and shaves. To this end valve 17 has a forwardly extending stem 34 projecting from the gun and on which is a compression spring 35 operating against a flange 36 so as normally to hold the valve 17 closed. Likewise valve 27 has a rearwardly projecting stem 37 on which is a compression spring 38 operating against a flange 39 so as normally to maintain valve 27 closed. Valve stems 34 and 37 are so arranged as to be operable by a single trigger 40, valve stem 37 extending through an aperture 41 in the trigger which is arranged to engage the flange 39 to open valve 27 against the action of spring 38, and the end of valve stem 34 being arranged to be engaged as the trigger is pulled to open valve 17. Valve stem 34 and flange 39 on valve stem 38 are so arranged that pulling of the trigger against spring 35 will first open valve 17 to cause the gun to emit a stream of air only out of orifice 24. Pulling of the trigger further, and against the additional pressure of spring 38 will open valve 27 and send a thin stream of air under pressure down into receptacle 28 stirring up the contents thereof whereby the powder 32 will be entrained in the air and will pass freely through duct 33 and out of the end of the gun. The trigger 40 may be pivoted on the gun as at 40ª.

It will be apparent that with the device, the surface of the skin may be quickly dried by evaporation by application of a stream of rapidly moving air, hair-cuttings may be effectively blown from the surface of the skin and powder may be applied to the surface of the skin, all without application of towels, brushes or other unsanitary devices to the surface of the skin.

Modifications of the invention may be resorted to without departing from the spirit thereof or the scope of the appended claims.

What is claimed is:

1. A combined air blower and powder spraying device comprising means providing an air duct, a valve on said air duct, means providing an air outlet duct from said valve, a powder receptacle, means providing a duct connecting said air outlet duct with said powder receptacle, a valve on said connecting duct, means providing an air and powder outlet duct from said receptacle, and means for operating said valves so as to supply a stream of air only from said device or a stream of air along with entrained powder.

2. A combined air blower and powder spraying device comprising means providing an air duct a valve on said air duct, means providing an air outlet duct from said valve, a powder receptacle, means providing a duct connecting said air outlet duct with said powder receptacle, a valve on said connecting duct, means providing an air and powder outlet duct from said receptacle, and means for operating said valves so as to supply a stream of air only from said device or a stream of air along with entrained powder, said air outlet duct having a restricted outlet orifice.

3. A combined air blower and powder spraying device comprising means providing an air duct, a valve on said air duct, means providing an air outlet duct from said valve, a powder receptacle, means providing a duct connecting said air outlet duct with said powder receptacle, a valve on said connecting duct, means providing an air and powder outlet duct from said receptacle, and means for operating said valves so as to supply a stream of air only from said device or a stream of air along with entrained powder, said connecting duct having a restricted outlet orifice for supplying air to said receptacle.

4. A combined air blower and powder spraying device comprising means providing an air duct, a valve on said air duct, means providing an air outlet duct from said valve, a powder receptacle, means providing a duct connecting said air outlet duct with said powder receptacle, a valve on said connecting duct, means providing an air and powder outlet duct from said receptacle, and means for operating said valves.

5. A device of the character described comprising means providing a duct for directing a stream of air, means for supplying air to said duct, means for maintaining a supply of powder in the device, means providing a separate duct for directing a stream of air from the supplying means into said powder, and means providing a separate duct for directing a stream of air and entrained powder from the powder supply, and means operable at will to provide a stream of air alone from said first named duct or a stream of air along with entrained powder from said last named duct.

6. A combined air blower and powder spraying device comprising means providing an air duct, a valve on said air duct, means providing an air outlet duct from said valve, a powder receptacle, means providing a duct connecting said air outlet duct with said powder receptacle, a valve on said connecting duct, means providing an air and powder outlet duct from said receptacle and means for operating said valves so as to supply a stream of air only from said device or a stream of air along with entrained powder, said means comprising a movable trigger so associated with said valves as to be operable over a portion of its movement to open only the valve on said first-named air duct and upon continuation of said movement to open the valve on said connecting duct.

HARLEY W. HOFFMAN.